United States Patent Office 3,385,885
Patented May 28, 1968

3,385,885
11 - METHYLAMINO - 9,10 - ETHANO - 9,10 - DIHYDRO-ANTHRACENE AND ITS ACID-ADDITION SALTS
Keizo Kitahonoki, Nara, and Ryonosuke Kido, Osaka, Japan, assignors to Shionogi & Co., Ltd., Osaka, Japan
No Drawing. Filed Jan. 22, 1965, Ser. No. 427,458
Claims priority, application Japan, Jan. 27, 1964, 39/3,893, 39/3,895
1 Claim. (Cl. 260—501.21)

ABSTRACT OF THE DISCLOSURE

The present invention relates to 11-methylamino-9,10-dihydroanthracene and its acid-addition salts, and to the production thereof.

It is an object of the present invention to embody 11-methylamino-9,10-ethano-9,10-dihydroanthracene and its acid-addition salts. Another object of this invention is to embody 11-methylamino-9,10-ethano-9,10 - dihydroanthracene and its acid-addition salts useful as anti-depressants. A further object of the invention is to embody a process for preparing 11-methylamino-9,10-ethano-9,10-dihydroanthracene and its acid-addition salts. These and other objects will be apparent to those conversant with the art to which the present invention pertains from the subsequent description.

The said 11-methylamino-9,10-ethano-9,10-dihydroanthracene (hereinafter referred to as "methylamino compound") is represented by the formula:

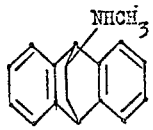

(I)

The methylamino compound I was first attempted to be prepared from 11-amino-9,10-ethano-9,10-dihydroanthracene (hereinafter referred to as "amino compound") represented by the formula:

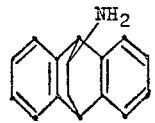

(II)

in a single step. That is, the amino compound II was reacted with methyl iodide in a conventional methylation manner, but there was obtained only a mixture of the starting amino compound II and its methiodide. In view of such an unsuccessful result, other methods for production of the methylamino compound I have been studied, and an industrial process for preparing the same has now been completed.

According to the present invention, the methylamino compound I is prepared from the amino compound II by two steps, i.e. formylation and reduction. Thus, the amino compound III is reacted with formic acid or a lower alkyl formate (e.g. methyl formate, ethyl formate) in an autoclave at 60 to 120° C. and the resultant 11-formylamino-9,10-ethano-9,10-dihydroanthracene represented by the formula:

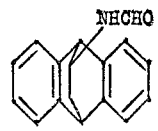

(III)

treated with lithium aluminum hydride in an inert organic solvent (e.g. ether, dioxane, tetrahydrofuran) at room temperature (10 to 30° C.) to give the methylamino compound I.

The thus prepared methylamino compound I may be, when required, converted into such acid-addition salts suitable for the purpose of medical use as of low toxicity and desirable stability. The conversion can be effected by a conventional procedure, e.g. treatment of the methylamino compound I with an acid in an appropriate solvent. Examples of the pharmaceutically acceptable acid-addition salts are hydrochloride, hydrobromide, hydroiodide, sulfate, nitrate, phosphate, thiocyanate, oxalate, succinate, tartrate, malate, citrate, benzoate, phthalate, salicylate and naphthalenedisulfonate.

The thus obtained methylamino compound I and its pharmaceutically acceptable acid-addition salts are useful as anti-depressants. For instance, 11-methylamino-9,10-ethano-9,10-dihydroanthracene hydrochloride inhibits the ptosis in rats induced by subcutaneous administration of 10 milligrams of reserpine per kilogram of body weight, when previously administered by subcutaneous route at a dose of 5 milligrams per kilogram of body weight. Further, the previous administration of 1 milligram of the said compound per kilogram of body weight by intravenous route increase the nictitating membrane contraction in urethan and phenobarbital sodium anesthetized cats caused by intravenous administration of $10^{-2}$ milligram of adrenaline or noradrenaline per kilogram of body weight. The previous administration of 2.5 milligrams of the said compound per kilogram of body weight by intravenous route also increases the blood pressure elevation in urethan and phenobarbital sodium anesthetized cats caused by intravenous administration of $10^{-2}$ milligrams of adrenaline or noradrenaline per kilogram of body weight. Furthermore, the said compound promotes recovery of rats from the de-conditioned response induced by electroconvulsive shock, when given intravenously at a dose of 2 milligrams per kilogram of body weight. Furthermore, a concentration of $10^{-1}$ milligram per millilitre of the said compound produces more than 90% block of the construction of uterus isolated from rats caused by a concentration of $10^{-5}$ milligrams per millilitre of serotonin. Still, the acute toxicity ($LD_{50}$) of the said compound in mice is as follows: intravenous, 34.5 milligrams per kilogram of body weight; subcutaneous, 110.2 milligrams per kilogram of body weight; oral, 214.3 milligrams per kilogram of body weight.

The methylamino compound I and its pharmaceutically acceptable acid-addition salts may be administered alone or in combination with acceptable pharmaceutical carriers, the choice of which is determined by the preferred route of administration, the solubility of the substance and standard pharmaceutical practice. Examples of pharmaceutical preparations are tablets, capsules, pills, suspensions and solutions. In the preparation of tablets, for example, these substances may be combined with binders such as gum tragacanth, acacia, corn starch, gelain, etc. It is also usually desirable to have present a disintegrating agent such as, for example, corn starch, potato starch, alginic acid or the like. Also desirable usually is a lubricant such as stearic acid, magnesium stearate or talc along with sweetening agents such as saccharin. Flavoring agents may also be used such as peppermint, oil of wintergreen or cherry flavor. In the preparation of capsules, fillers such as enumerated above for tablets can also be used. The compositions when used in the form of suspensions or solutions may be combined with aqueous sugar or sorbitol type vehicle including a viscosity control agent such as Veegum (magnesium aluminum silicate), Methocel or carboxymethylcellulose and a suitable preservative such as sodium benzoate or parabens (methyl and propyl p-hydroxybenzoic acid salts). In these liquid preparations, colorings, flavoring and buffers can also be included to produce a more pharmaceutically elegant preparation.

The compositions containing the methylamino compound I or its pharmaceutically acceptable acid-addition salt may be dispensed in dosage unit forms for a single daily therapeutic dose or in smaller units for multiple doses or in larger units for division into single doses. Parenteral compositions can also be dispensed in single units or in larger quantities from which single doses are withdrawn at the time of use. In general, the dosage of these substances is of approximately the same order of magnitude as the dosages of N-(γ-dimethylaminopropyl)-iminodibenzyl hydrochloride, and these substances are useful to treat the types of depressed conditions often treated with the said known anti-depressant.

Presently-preferred and practical embodiments of the present invention are illustratively shown in the following examples. In these examples, the relationship of parts by weight to parts by volume is the same as that between grams and milliliters. Temperatures are set forth in degrees centigrade.

Example 1

A mixture of 11-amino-9,10-ethano - 9,10 - dihydroanthracene (4.0 parts by weight) and ethyl formate (13.4 parts by weight) is heated in an autoclave on a steam bath (100° C.) for 4 hours. After cooling, the resultant mixture is dissolved in chloroform, washed with 5% sodium hydroxide solution, 10% hydrochloric acid and water in order, dried over anhydrous sodium sulfate and the solvent evaporated. The residue is crystallized from acetone to give 11-formylamino-9,10-ethano-9,10-dihydroanthracene (4.4 parts by weight) as plates melting at 194 to 195° C.

IR $\nu_{max.}^{Nujol}$ cm.$^{-1}$: 3376, 1676, 1506, 1043, 774, 761

Example 2

To a suspension of lithium aluminum hydride (3.8 parts by weight) in anhydrous ether (200 parts by volume), there is added portionwise 11-formylamino-9,10-ethano-9,10-dihydroanthracene (4.0 parts by weight) while stirring at 13° C. in 20 minutes. Stirring is then continued at room temperature (10 to 30° C.) for 19 hours. The reaction mixture is combined with water (20 parts by volume) to decompose excess of the reducing agent and filtered. The collected material is washed with hot chloroform. The washing chloroform is combined with the filtrate, dried over anhydrous sodium sulfate and concentrated to give a yellow oil (3.9 parts by weight).

The oil is dissolved in ether and shaken with 10% hydrochloric acid. The aqueous layer is made alkaline with potassium carbonate and shaken with ether. The ether layer is washed with water, dried over anhydrous sodium sulfate and the solvent evaporated to give 11-methylamino-9,10-ethano-9,10-dihydroanthracene (3.7 parts by weight) as an oil. The oil is treated with ethereal hydrochloric acid and the resulting substance crystallized from a mixture of acetone and methanol to give 11-methylamino-9,10-ethano-9,10-dihydroanthracene hydrochloride as needles melting at 232 to 233° C. (decomp.).

IR $\nu_{max.}^{Nujol}$ cm.$^{-1}$: 2673, 2458, 1576, 1010, 1002, 908, 763, 757, 745

Example 3

11-methylamino-9,10-ethano-9,10 - dihydroanthracene hydrochloride (2.50 kilograms), lactose (7.47 kilograms), cornstarch (3.48 kilograms) and magnesium stearate (2.10 kilograms) are mixed together and slugged. The slugs are crushed and passed through a 30 mesh screen. The resulting granules are mixed with magnesium stearate (2.45 kilograms) and tableted in the usual way to give 100,000 tablets. Each tablet weighing 180 milligrams contains 25.0 milligrams of the active ingredient.

Example 4

11-methylamino - 9,10 - ethano-9,10-dihydroanthracene hydrochloride (10.00 kilograms) and lactose (20.00 kilograms) are mixed, granulated with 10% acacia solution and dried. The granulate is forced through a 16 mesh screen and, thereafter, mixed with sodium lauryl sulfate (0.20 kilogram), magnesium stearate (1.00 kilogram) and amylum solani (8.80 kilograms). The resultant mixture is tableted in the usual way to give 100,000 tablets. Each tablet weighing 40 milligrams contains 20.0 milligrams of the active ingredient.

Example 5

11-methylamino-9,10-ethano - 9,10 - dihydroanthracene hydrochloride (125 grams) is dissolved in physiological saline solution to make 10 litres and filtered. The resultant solution is filled into 5,000 ampoules under nitrogen atmosphere and the ampoules are sterilized at 115° C. for 30 minutes. Each ampoule (2 millilitres) contains 25.0 milligrams of the active ingredient.

What is claimed is:
1. 11-methylamino-9,10-ethano - 9,10 - dihydroanthracene and its pharmaceutically acceptable acid-addition salts.

References Cited
UNITED STATES PATENTS

| | | | |
|---|---|---|---|
| 2,953,423 | 9/1960 | Buc | 260—5620 |
| 3,159,677 | 12/1964 | Godefroi | 260—578 |
| 3,201,401 | 8/1965 | Krapcho | 260—5620 |
| 3,221,054 | 11/1965 | Bentham et al. | 260—570.7 |
| 3,228,976 | 1/1966 | Humber | 260—578 |

OTHER REFERENCES

Wawzonek et al.: Journal of Organic Chemistry, vol. 18, No. I (March 1953), 288–91.

LORRAINE A. WEINBERGER, *Primary Examiner.*

M. WEBSTER, *Assistant Examiner.*